(12) United States Patent
Dailey (10) Patent No.: US 9,015,594 B2
(45) Date of Patent: Apr. 21, 2015

(54) METHOD AND APPARATUS FOR EFFICIENT DISPLAY OF CRITICAL INFORMATION IN A DISPATCH ENVIRONMENT

(75) Inventor: Timothy Eugene Dailey, Forest, VA (US)

(73) Assignee: Harris Corporation, Melbourne, FL (US)

(*) Notice: Subject to any disclaimer, the term of this patent is extended or adjusted under 35 U.S.C. 154(b) by 1201 days.

(21) Appl. No.: 12/504,369

(22) Filed: Jul. 16, 2009

(65) Prior Publication Data

US 2011/0016401 A1    Jan. 20, 2011

(51) Int. Cl.
*G06F 3/01* (2006.01)
*H04M 3/51* (2006.01)

(52) U.S. Cl.
CPC .......... *H04M 3/5116* (2013.01); *H04M 3/5175* (2013.01); *H04M 2201/38* (2013.01); *H04M 2201/42* (2013.01)

(58) Field of Classification Search
CPC ............ H04M 3/5116; H04M 3/5175; H04M 2201/42
USPC ......................................................... 715/736
See application file for complete search history.

(56) References Cited

U.S. PATENT DOCUMENTS

| | | | |
|---|---|---|---|
| 4,926,495 A | | 5/1990 | Comroe et al. |
| 5,423,061 A | | 6/1995 | Fumarolo et al. |
| 5,649,132 A | | 7/1997 | Fumarolo et al. |
| 5,754,960 A | * | 5/1998 | Downs et al. ................. 455/508 |
| 5,999,820 A | * | 12/1999 | Sutanto et al. ............... 455/508 |
| 6,184,882 B1 | | 2/2001 | Coley et al. |
| 6,204,844 B1 | * | 3/2001 | Fumarolo et al. ............ 715/736 |
| 6,477,387 B1 | | 11/2002 | Jackson et al. |
| 7,035,658 B2 | | 4/2006 | Drozt et al. |
| 7,436,937 B2 | | 10/2008 | Clawson |
| 7,633,914 B2 | * | 12/2009 | Shaffer et al. ................. 370/338 |
| 7,978,826 B2 | * | 7/2011 | Salafia et al. ................... 379/37 |
| 2005/0034075 A1 | | 2/2005 | Riegelman et al. |
| 2005/0037794 A1 | | 2/2005 | Namm et al. |
| 2006/0236328 A1 | * | 10/2006 | DeWitt ......................... 719/329 |
| 2008/0310600 A1 | * | 12/2008 | Clawson ......................... 379/45 |
| 2009/0100165 A1 | * | 4/2009 | Wesley et al. ................. 709/223 |
| 2010/0199188 A1 | | 8/2010 | Abu-Hakima et al. |
| 2010/0227583 A1 | * | 9/2010 | Roy et al. ................... 455/404.1 |
| 2011/0126111 A1 | | 5/2011 | Gill et al. |
| 2012/0144305 A1 | | 6/2012 | Bekiares et al. |

\* cited by examiner

*Primary Examiner* — Anil Bhargava
(74) *Attorney, Agent, or Firm* — Fox Rothschild LLP; Robert J. Sacco, Esq.

(57) ABSTRACT

The invention pertains to methods and apparatus for displaying information about a communication network efficiently in a compact display area that can occupy a small portion of a monitor. The methods and apparatus also provide efficient mechanisms for interfacing with the communication network and calling up additional information at will.

43 Claims, 8 Drawing Sheets

METHOD AND APPARATUS FOR EFFICIENT DISPLAY OF CRITICAL INFORMATION IN A DISPATCH ENVIRONMENT

FIELD OF TECHNOLOGY

The invention pertains to user interfaces for displaying information in connection with communication systems. More particularly, the invention pertains to user interfaces for dispatchers on public safety and similar communications systems.

BACKGROUND

Communication systems, including radio communication systems, can be quite complex. Such communication systems may include numerous communication channels with many receivers, transmitters, and transceivers all operating simultaneously on the communication network. In certain types of communication network, certain individuals, hereinafter operators, are responsible for monitoring and controlling communications and communicating with field personnel via the communication network to coordinate the efforts and locations of the field personnel.

A classic example of such an operator is a dispatcher of a public safety radio telecommunication network used by public safety officials, such as police, fire fighters, emergency medical technicians (EMTs), hospitals, etc. Other examples include military operations, dispatchers for transportation companies such as trucking companies, taxi companies, and other livery companies, shipping and courier companies such as Federal Express and the United States Postal Service, and utility companies such as telephone, cable television, electricity, and gas companies. These dispatchers are often responsible for coordinating the efforts of a large number of field personnel, such as police officers, fire fighters, taxi drivers, repair and installation crews, etc.

It is common for a single dispatcher to have these responsibilities with respect to a plurality of different talk groups. A talk group, as used herein, is a set of radio devices that can communicate with each other. For instance, police officers may comprise one talk group while fire fighters comprise a different talk group. Generally speaking, the police officers can communicate with the dispatcher and with each other using one set of communication channels and the firefighters can communicate with each other and the dispatcher using another set of channels, but the firefighters and the police officers in different talk groups cannot communicate with each other directly over the communication network.

A single dispatcher may oversee a very large number of different talk groups, possibly numbering in the hundreds. A talk group may be an individual police unit (e.g., SWAT, Narcotics, Canine), an individual police department, an individual EMT group, the members of an individual fire station, or combinations thereof (e.g., the New York City Fire Department and the New York City Police Department combined may be a talk group, while the New York City Police Department and the New York City Fire Department also are two other talk groups).

Commonly, a dispatcher sits at a dispatch station that may be in a control room shared with several other dispatchers. Each dispatcher station typically comprises a plurality of computer monitors and other user interface devices (such as computer mouses, foot switches, speakers, microphones, etc.).

Dispatchers frequently work under emergency conditions in which potentially life and death decisions must be made under severe time constraints.

A typical dispatcher station may have about three to six monitors between which the dispatcher must divide his or her attention. In the exemplary dispatcher station illustrated in FIG. 1, the dispatcher 10 has four monitors 11, 12, 13, 14, three of which (12, 13, 14) are under the control of and use by a computer aided dispatch (CAD) computer system 15 that displays to the dispatcher 10 important information, such as the locations and identities of various field personnel and equipment and the location and identity of various situations or incidents that require the attention of the field personnel. Typically, another monitor 11 is dedicated for use by a dispatch console 16. A dispatch console essentially is a specially programmed computer 16 (it may be a general purpose computer running special dispatch console software) that manages the communication assets at the dispatcher's disposal and displays information about the communication network on a monitor like monitor 11 that is dedicated to the dispatch console. Each dispatch station further typically has a plurality of speakers 17, 18 on which the communications of the various talk groups are heard. Each speaker typically has the communications of a plurality of talk groups on it. The dispatcher normally also has a two-way communication headset 18 on which the dispatcher usually communicates with one particular talk group at any given time (or possibly a patch or simulselect group as will be discussed further below).

By way of a typical example, using a public safety dispatcher as an example, a call taker at a 911 center receives calls from the general population relating to emergencies and other public safety situations and types up an incident report with the critical information about the emergency, such as the nature and the location of the emergency, and sends it electronically to a dispatcher's CAD system. The dispatcher reviews the information and makes a determination based on his or her experience as to what field assets (personnel, equipment, etc.) should be assigned to the incident as a function of the size and nature of the incident, the available assets and their locations, other on-going incidents, and then uses the dispatch console to create, manipulate, and control talk groups and communicate with field personnel to attempt to address the incident.

A typical dispatch console software product, such as the Maestro$^{IP}$ system sold by Harris Corporation, provides hundreds upon hundreds of features. Often, the government entities and companies that purchase these systems set up the communication network and dispatch stations using only a small, custom-selected subset of all of the available features of the dispatch console. The individual dispatchers may also wish to customize their stations to their own liking. However, often, the companies or government entities do not permit further customization by the dispatchers for several reasons. First, having a uniform graphical user interface simplifies training of new dispatchers, since all dispatchers are trained on identical systems. Furthermore, dispatching commonly is a twenty-four hour a day operation such that dispatchers usually work in shifts and, therefore, each dispatch station is actually used by a plurality of different dispatchers every day. When dispatchers change shifts, particularly in the middle of one or more emergencies, there is no time to reconfigure the station and no time to learn the configuration use by the preceding dispatcher. Therefore, having a uniform graphical user interface for all dispatchers will facilitate shift switches without confusion.

Even where all of the dispatchers have the same graphical user interface, each individual dispatcher usually has his or her own individual subset of those features within the uniform graphical user interface that he or she tends to use most often.

Figure 1:
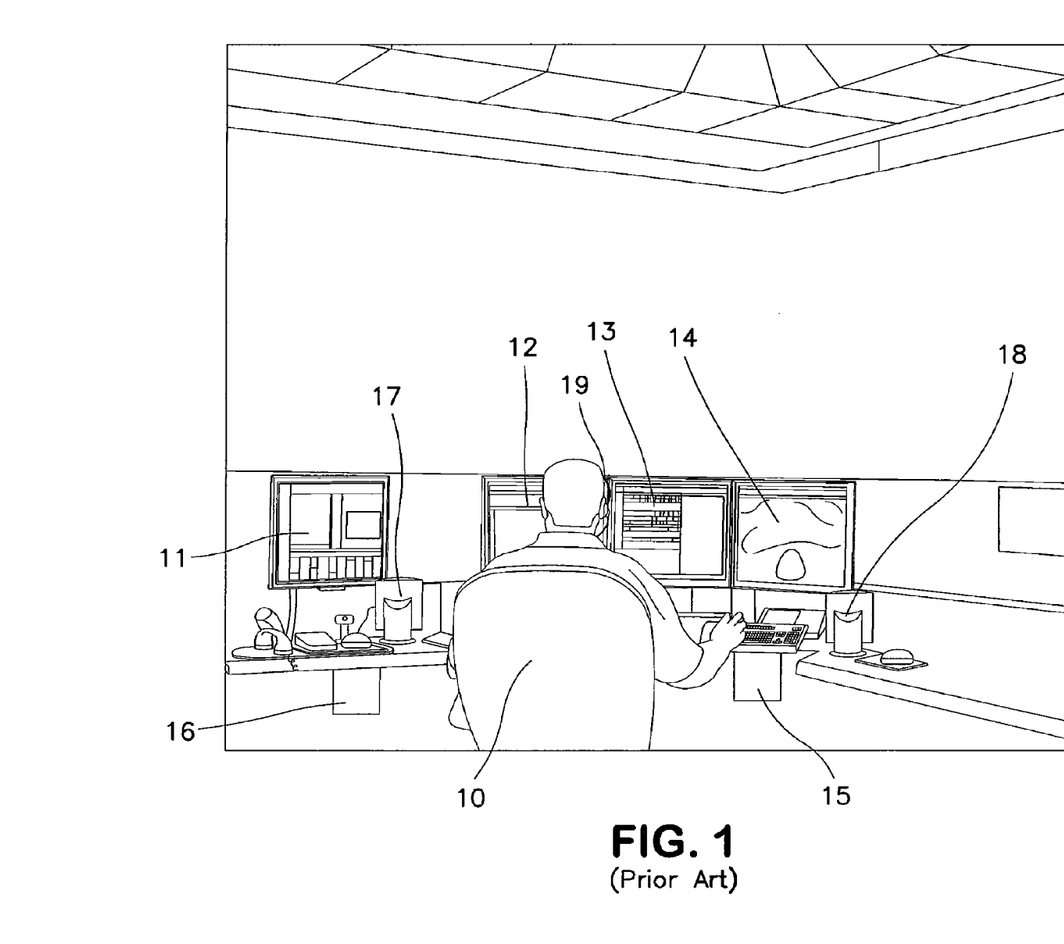
FIG. 1 illustrates a typical dispatch station.

Normally, a dispatcher's attention is primarily directed to the CAD system monitors 12, 13, 14, and not to the dispatch console monitor 11, which often is positioned off to the side of the CAD monitors. Nevertheless, the dispatch console has an extremely critical role in enabling the dispatcher to perform his or her duties.

SUMMARY

The invention pertains to methods and apparatus for displaying information about a communication network efficiently in a compact display area that can occupy a small portion of a monitor. The methods and apparatus also provide efficient mechanisms for interfacing with the communication network and calling up additional information at will.

In one embodiment, a compact dispatch interface is provided that is highly configurable by the user. In another embodiment, a standard dispatch console graphical user interface remains unaffected on its dedicated monitor, and the compact dispatch interface is docked on another monitor, such as a monitor that is primarily dedicated to a computer aided dispatch system and the compact dispatch interface displays a subset of the information that is also available on the dedicated dispatch console monitor.

DETAILED DESCRIPTION OF EMBODIMENTS

Figure 2:
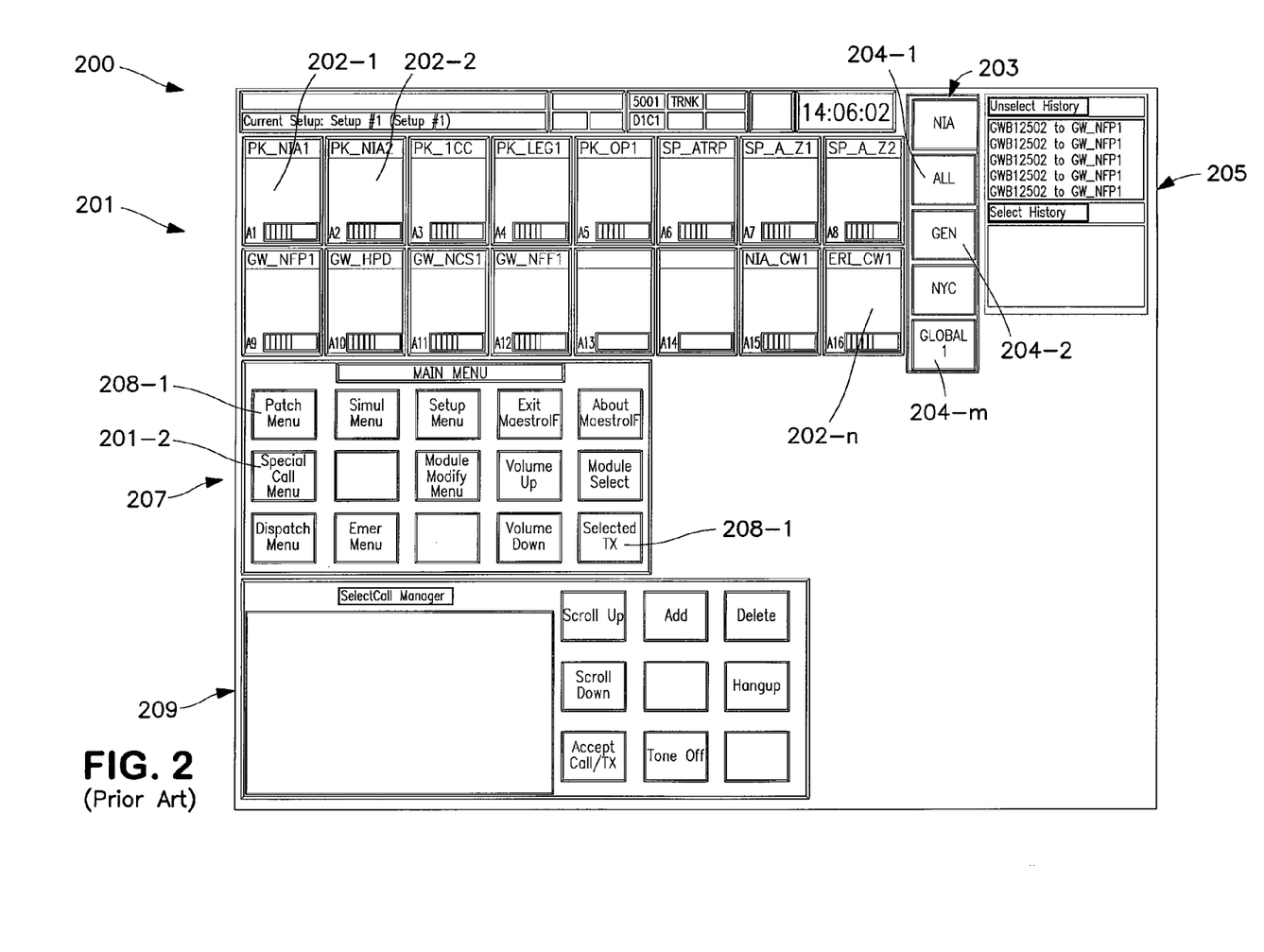
FIG. 2 illustrates a conventional dispatch console graphical user interface designed to be displayed on a fully dedicated display monitor.

FIG. 2 illustrates a graphical user interface 200 for a dispatch console in which the interface 200 is designed for use on a full monitor dedicated to the dispatch console. FIG. 2 is merely exemplary of one particular dispatch console graphical user interface for purposes of illustration, namely, the Maestro$^{IP}$ dispatch console software sold by Harris Corporation. The graphical user interface for this particular software package is highly customizable, as is the case for many other dispatch consoles. Portion 201 of the display includes a plurality of rectangles 202-1, 202-2, . . . , 202-*n*, each rectangle corresponding to a specific talk group. Typically, each rectangle will display some information about the corresponding talk group. Since there can be hundreds of different talk groups, they commonly might be arranged for display on a plurality of pages. Section 203 of the display shows the various pages of talk groups that can be brought up in portion 201 by pressing one of the page buttons 204-1, 204-2, . . . , 204-*m* in section 203. As used herein, phrases such as "pressing" or "activating" or "operating" are used in the conventional sense in the art of graphical user interfaces and include such actions as actually touching the monitor screen (in the case of touch-sensitive display), moving a cursor over a display button using a computer mouse and operating (e.g., clicking, double clicking, etc.) one of the buttons on the mouse, stepping on a foot switch, etc.

A third portion of the screen 205 displays a call history, which may include a list of all calls to the dispatcher in chronological order. Each entry in the list may include information such as the time of the call, an alphanumeric ID of the caller, and the talk group to which the caller belongs. A fourth portion 207 of the screen comprises a plurality of buttons 208-1, 208-2, . . . , 208-1 that may be operated to cause something to happen with respect to a one of the talk groups that has previously been selected in portion 201 (such as by left clicking on it). Some of the buttons may open up menus containing additional information and/or buttons. The particular operation or additional information to which each button corresponds will depend, of course, on the particular system and the primary focus of its intended users, but may include things such as volume up, volume down, transmit (i.e., push to talk), etc. Finally, in this example, a fifth portion of the screen 209 is dedicated to an interface for handling individual calls from radios and persons outside of the normal framework of the pre-designated talk groups. This portion may include further buttons, lists, and information that affect communication with respect to such individual calls.

Figure 3:
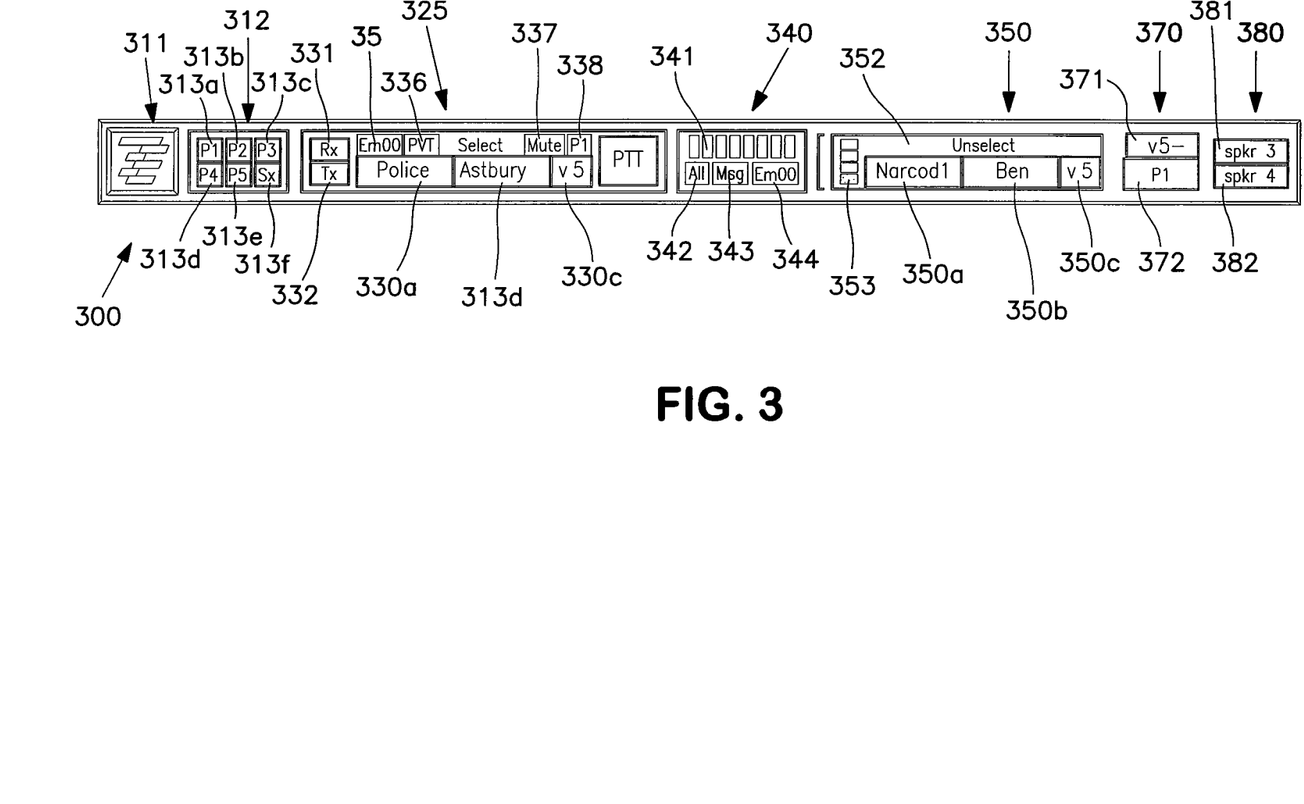
FIG. 3 illustrates a compact dispatch interface in accordance with one embodiment of the invention.

FIG. 3 illustrates a compact dispatch interface (CDI) 300 that condenses some of the most critical and/or often-used information and features found in a graphical user interface of a typical dispatch console for a dedicated display monitor into a very small screen area. In one embodiment, the CDI does not replace the dedicated dispatch console graphical user interface. Rather, it is supplemental thereto, containing the most critical and/or often-used information and buttons that also are found on the dedicated graphical user interface and can be displayed in a corner or along an edge of one of the display monitors that is occupied primarily by the graphical user interface of another program, such as a CAD system. It may be in the form of a toolbar (arranged horizontally or vertically) or broken up and distributed around in free areas of the main application.

The CDI 300 may be a software module running within the dispatch console software. Alternatively, it may be provided as a plug-in software module that plugs into the CAD software. However, in one embodiment, it is its own exclusive software application that runs independently and exclusive of the dispatch console software. In one embodiment, the exclusive CDI 300 software runs on the computer that is running the CAD (or other) system, but does not interface with the CAD software. The advantage of this particular embodiment is that the manufacturer of the CAD system essentially does not need to modify its CAD software in any way to integrate the CDI into it. Rather, the CAD system manufacturer merely needs to obtain a copy of the CDI software and load it onto its computer as a separate software application. The CDI software requires very few computer resources from the CAD system computers. Particularly, most of the processing power necessary to support and manage the communication system remains on the dispatch console computer. The CDI software interfaces with the dispatch console software via a simple application programming interface (API) or other common form of software interface to manage the communication resources. Depending on the features available through the CDI, to the extent the CDI 300 may need to interface with the CAD software, this also can be accomplished through the use of one or more appropriate APIs or the like. The only processes related to the CDI that run on the CAD system computer are the software for generating the actual CDI graphical user interface and one or more simple APIs that allow the CDI to communicate with the dispatch console software. The dispatch console software still performs all of the processor intensive operations, with the CDI 300 merely sending user instructions (based on user inputs through the CDI) to the dispatch console via an API and receiving information that it needs to display from the dispatch console via an API.

FIG. 3 shows one example of a CDI in accordance the principles of the present invention in which a significant amount of information and operational options are made available in a very small interface that can reside on (and consume a small portion of) a monitor primarily occupied by the GUI of a CAD system. As will be described in detail herein below, almost every individual piece of data displayed in this CDI also comprises a UI (User Interface) control (e.g., a button) that can be operated to either effect an operation in the communication system or cause the display of additional information and/or UI controls.

In this specification, every portion of the display that has an operation that can be performed by activating it (e.g., by touching it (if a touch screen) or clicking on it using a mouse-controlled pointer) or discloses variable data (e.g., is not merely an aesthetic element) may be referred to herein as a button, UI control, or widget. It should be understood that these terms are being used broadly and in an exemplary manner and are intended to encompass any reasonable user operable graphical interface element, such as radio buttons, toggle buttons, push buttons, checkboxes, sliders, list boxes, dialog boxes, pop up menus, etc.

Referring now to the specific exemplary CDI 300 of FIG. 3, section 311 is a button that, when activated, opens a main menu (not shown). The main menu in this embodiment would not be accessed during normal dispatcher operations. The main menu contains buttons, etc. that provide basic CDI operations like logging in and out, exiting the CDI program, and an "About" dialog.

Section 313 is dedicated to functions pertaining to patch and simulselect operations. A patch is a temporary conjunction of two or more talk groups that are not normally permitted to communicate with each other directly through the communication network. Activating a patch group allows the dispatcher to communicate with all members of all of the talk groups in the patch group and also allows the individual members of those talk groups to communicate with each other directly. For instance, one talk group may be the city of Springfield police department and another talk group may be the Springfield fire department. Members of these two talk groups normally cannot communicate with each other over the communication network. However, in certain emergency situations, e.g., a car accident involving a flammable liquid on fire, it may be necessary to allow radios in these two talk groups to communicate with each other directly via the communication network.

Section 313 provides a plurality of buttons, in this example six toggle buttons 313a-313f that can be operated to create, manipulate, and select patch groups and/or simulselect groups. Patch groups may be created ahead of time or as situations arise and can be activated by, for instance, left clicking on any one of corresponding buttons 313a-313f in section 313. Preferably, activating the corresponding patch group also causes the button to change appearance (e.g., color change, highlighted, shadow, etc.) so that the dispatcher can visually see if and which patch groups are activated. Multiple patch groups may be activated simultaneously.

Simulselect is similar to a patch in the sense that it is a conjoining of two or more talk groups that allows the dispatcher to speak with members of all of the groups in the simulselect group, but the individuals in the various separate talk groups remain unable to speak with each other. Of course, individuals in each talk group comprising the simulselect group still can speak with the other individuals in their same talk group. In exemplary CDI 300, five patch groups and one simulselect group are offered in section 313. However, the numbers are merely exemplary.

Figure 4:
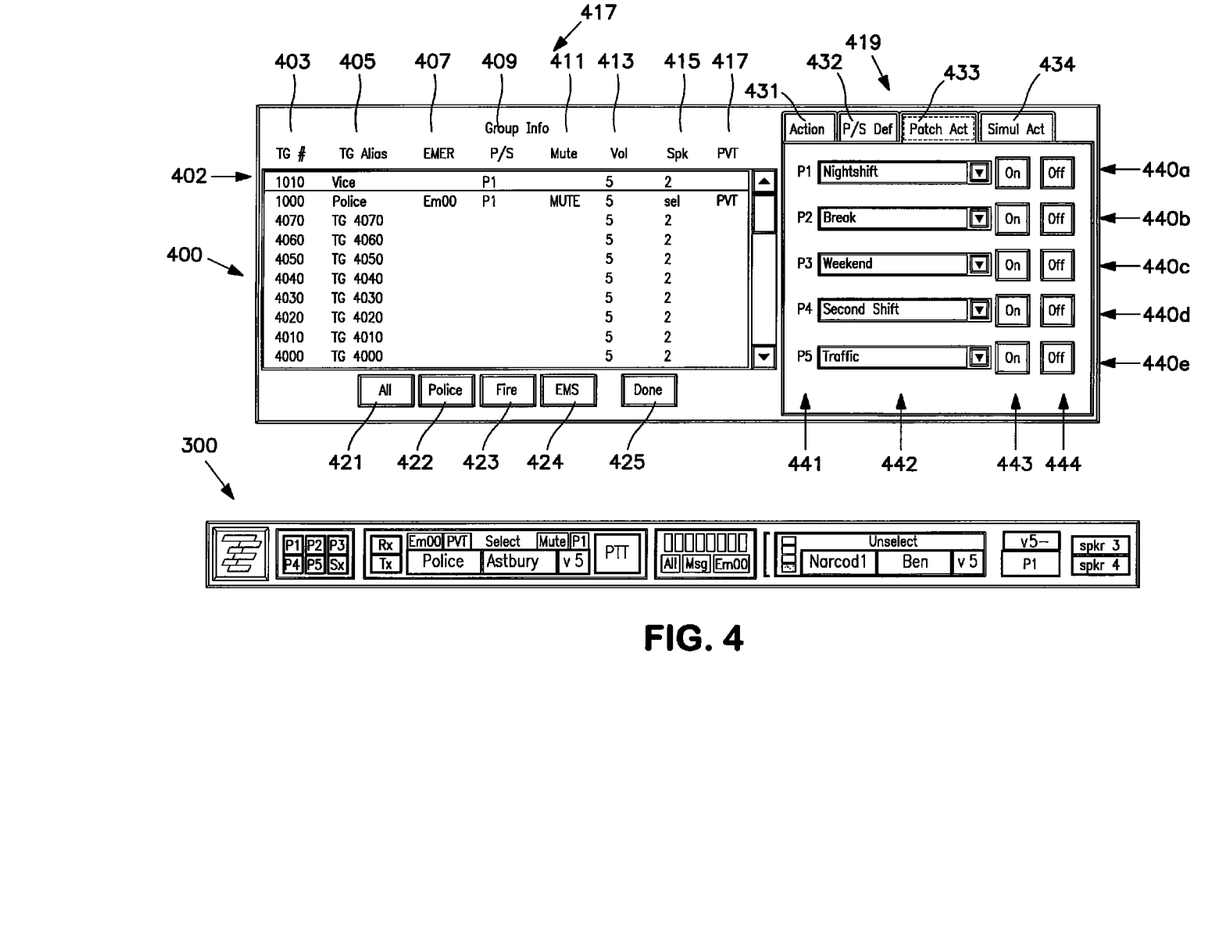
FIG. 4 illustrates some of the features of and additional graphical user interfaces that can be called up from the compact dispatch interface.

Referring now to FIG. 4, it shows the CDI 300 and a dialog window 400 that can be called up for display by a UI control input, i.e., a user operation such as right clicking anywhere within section 313. References to specific user operations in this specification (such as the aforementioned right clicking of a computer mouse device) are exemplary.

Window 400 is a graphical user interface (GUI) for performing various operations with respect to the patch and simulselect groups. The window 400 has two primary portions. The left portion 417 is an ordered list of all of the available talk groups at the disposal of the dispatcher. Each row in the list corresponds to a single talk group, e.g., 402. Each column provides a certain piece of information about a talk group. This exemplary list shows, for each talk group, in the columns from left to right, (1) the talk group number 403, (2) an alphanumeric name 405 of the talk group for easy reference, (3) if there is a pending emergency pertaining to that talk group 407, (4) whether the talk group is part of an existing patch or simulselect group (and, if so, which one) 409, (5) whether that talk group is currently muted at the dispatcher's station 411, (6) the volume at the dispatcher's station to which the talk group is set 413, (7) which speaker the talk group is on 415, and (8) whether the communications of that talk group are encrypted 417.

The buttons 421, 422, 423, 424 at the bottom of the left-hand portion 317 are filter buttons. By left clicking on any of those buttons, the list of available talk groups in section 417 is filtered to include only the talk groups having certain properties. For instance, the "All" button 421 causes all available talk groups to be shown in section 417 (i.e., no filter), the "Police" button 422 causes only police talk groups to be shown, the "Fire" button 423 causes only firefighter talk groups to be shown, and the "EMT" button 424 causes only Emergency Medical Technician talk groups to be shown. The "Done" button 425 closes the entire window 400.

The right hand section 419 of window 400 provides an interface through which the dispatcher may create, manipulate, activate, deactivate, and modify patch groups and simulselect groups. In this example, there are four tabbed pages 431, 432, 433, 434 from which the dispatcher may select. When window 400 is called up by left clicking the mouse when the cursor is positioned over any of the buttons 313a-313f in section 313 of CDI 300, it is called up with one of the tabbed pages 431, 432, 433, 434 selected. Third tabbed page 433 is the patch activation/deactivation page, which shows relevant information for each of the five patch buttons 313a, 313e. If the cursor is positioned on any of the patch buttons 313a-313f that is already assigned to a defined patch group, then window 400 opens with the patch activation page 433 selected. If the button 313a-313e is assigned and activated, the group list in position 417 of window 400 is pre-filtered to show only the talk groups that are part of that patch group.

Another tabbed page (page 432) provides a GUI in which a dispatcher of other operator may define and create patch and simulselect groups. On the other hand, if the mouse is left clicked when the cursor is positioned over any of buttons 313a-313f and that button is presently unassigned to a patch or simulselect group, then window 400 is called up with the patch/simulselect group definition page 432 pre-selected.

Relevant information for each patch group button 313a-313e is displayed in one of rows 440a-440e in page 433. Column 441 displays the identity of the patch group button. Column 442 comprises drop down menus each containing a list of all patch group definitions, with the patch group definition to which the corresponding button is presently assigned shown in the main window. The names of the patch group definitions in this example are descriptive of when the dispatcher is likely to wish to use them (i.e., activate them). In this manner, the dispatcher can easily identify a patch group that should be activated in certain situations (like when the dispatcher takes a "break" and another dispatcher must cover for him or her for a brief period) without having to remember the actual talk groups in the patch. However, alternatively, the names could be descriptive of the talk groups comprising the patch group (like "Fire, Police, and EMT"). The dispatcher can change the patch button assignments using the drop down menus in column 442 in the conventional fashion of use of such drop down menus.

The last two columns 443, 444 are ON and OFF buttons, respectively, for activating the corresponding patch group. However, in at least one embodiment, the dispatcher also may activate and deactivate the patch and simulselect groups directly from the CDI 300 without calling up window 400 by simply double left clicking on the appropriate button 313a-313f.

The Simulselect activation tabbed page 434 (not shown, except for its tab) is similar to page 433 except that it pertains to simulselect groups rather than patch groups, and is automatically selected if window 400 is called up when the mouse is left clicked while the cursor is over button 313F.

Figure 8:
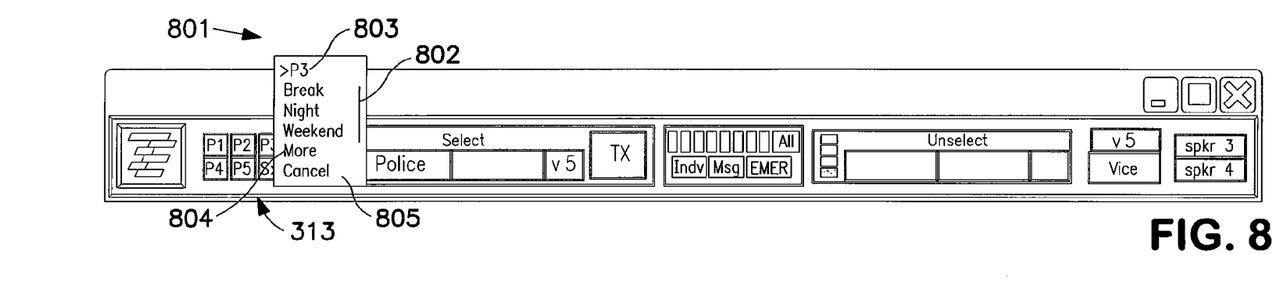
FIG. 8 illustrates a pop up window that can be opened from the patch/simulselect module in FIG. 3.

In accordance with another feature, illustrated in FIG. 8, the dispatcher may call up a simpler pop-up window 801 by a different UI control input, e.g., clicking a third computer mouse button while the cursor is positioned over any of buttons 313a-313f. This menu, for instance, may show a brief list 802 of the three most commonly used patch (or simulselect) groups and permit the dispatcher to assign the particular button to one of those patch groups by, e.g., left clicking the mouse while the cursor is positioned over the name of the particular patch group. In this example, in order to increase user friendliness, the pop up window shows the name of the button (P3 in this case) 803 at the top of the pop up menu. It also permits the dispatcher to select a "More" option 804 in the menu to be presented with a full patch dialog box, rather than the abbreviated patch pop-up window 801. Finally, the dispatcher may select the "cancel" option 805 to close the pop up window.

Returning to FIG. 3, section 325 of the CDI 300 is the select module and is dedicated to one particular talk, patch, or simulselect group (hereinafter talk group) selected by the dispatcher. Typically, the dispatcher will assign a talk group to this module corresponding to the particular incident on which the dispatcher is most focused. Presumably, it is the same group that the dispatcher has assigned to his or her head set. This section 325 shows the more significant information about the selected talk group and offers easy access to a number of operations. First, a text box 330a identifies the talk group. Text box 330b identifies the individual who is currently transmitting (if no one is presently transmitting, the box may be blank or, alternately, may show the last individual in that talk group to transmit). Text box 330c shows the volume to which the dispatcher has set the corresponding talk group. Particularly, typical dispatch consoles allow the dispatcher to electronically set the relative volume of each individual talk group. This is independent of the dispatcher's ability to control the overall volume of each speaker and his or her head set. More specifically, a dispatcher commonly will turn up the relative volume of the talk group or groups on which he is most focused. Knowledge of the volume to which each talk group is set also is extremely helpful in allowing the dispatcher to audibly determine from which talk group a particular transmission is coming and to focus on one or more particular talk groups. In one embodiment, the dispatcher can change the volume by performing some reasonable action within box 330c, such as double clicking to call up a volume slider or the like.

The Rx and Tx buttons 331 and 332 visually show the dispatcher when he is receiving a transmission on the select talk group or transmitting on the select talk group, respectively. These two buttons will light up or otherwise change appearance to indicate those conditions. Further, above the text boxes 330a-330c, area 334 bears the label "Select" to indicate that this is the select module. However, this area 334 also provides space for one or more alert buttons indicative of certain specific notable situations, when appropriate. For instance, the radios carried by field personnel in public safety networks often have an emergency button that the field personnel can press to indicate an emergent situation. If that button has been pressed by any of the field personnel in the selected talk group, then an Emergency button 335 appears in area 334. Also, if the selected talk group uses an encrypted channel, a PVT button 336 may appear in area 334. If the dispatcher has temporarily muted that selected talk group, a Mute button 337 will appear in area 334. Finally, if the selected group is a patch group or simulselect group, a button 338 will appear in area 334 indicating such.

Finally, select module 325 includes a TX button 339 that is essentially a press-to-talk (PTT) button that the dispatcher presses when he or she wishes to transmit on the select talk group (although dispatchers often also have a footswitch that causes them to broadcast on the selected talk group when they depress the footswitch).

Figure 9:
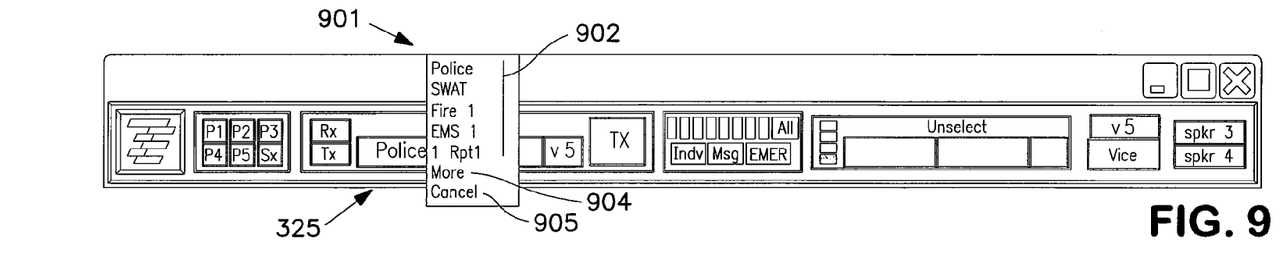
FIG. 9 illustrates another pop up window that can be opened from the select module in FIG. 3.

Again, the dispatcher may call up a small pop up window 900 such as illustrated in FIG. 9 by a particular UI control input, such as left clicking the computer mouse when the cursor is positioned over any of text boxes 330a-330c. In this exemplary embodiment, this opens a pop up window 901 showing a list 902 of five possible talk groups to assign to the select module 325. The subset of the available talk groups shown in the list may be selected based on any reasonable criteria, such as the talk groups most recently assigned to the select module 325, the talk groups most often assigned to the select module, or a predetermined list created by the dispatcher or network administrator at an earlier time. Finally, like the patch group pop up window 801, it also permits the dispatcher to select a "More" option 904 in the menu to be presented with a full select talk group dialog box, rather than the abbreviated pop-up window 901. Finally, the pop-up window 901 also includes a "cancel" option 905 to close the pop up window 901.

The next section is a general status section 340 that provides general information relevant to the overall communication system. It includes a simulated VU meter 341 that indicates the transmission level when the dispatcher is transmitting. It also includes space for at least three messages about the communication system. These messages can be any relevant messages. Illustrated are three messages, including a mute message 342 that indicates that the dispatcher has muted all talk groups other than the select talk group (as identified in the select module 330). Preferably, the mute message 342 is a button that the dispatcher can operate to unmute or mute the other talk groups when desired. Next is a message button 343 that appears when the dispatch console software has generated one or more messages for the dispatcher. These generally are messages related to the communication system as a whole. Preferably, the dispatcher may left click on button 343 to call up a window that displays the message(s). Finally, an Emergency button 344 appears when there is at least one pending emergency situation. The Emergency button preferably also includes a counter indicating the number of current emergencies. In one embodiment, the counter indicates the number of emergencies pending that have not been reset. Specifically, in many public safety radio communication systems, when an emergency is first indicated, such as by a field officer activating the emergency button on his or her radio, it causes several audio and/or visual alarms to activate in order to get the dispatcher's attention. For each such emergency, the counter counts up one unit. Once the dispatcher is aware of an emergency, the dispatcher usually "resets" the emergency, which causes the other visual and/or audible alarms to cease. This reset operation does not cancel the emergency or mean that the emergency is over, but merely that the dispatcher has tuned off the emergency alarms. When the dispatcher resets each emergency, the counter goes down by one. However, the Emergency alert 344 remains as long as at least one emergency is pending. Only when an emergency situation has been resolved does the dispatcher cancel the emergency (through an interface not represented in this particular exemplary CDI, but, for instance, an operation on the primary dispatch console interface displayed on monitor 11). When there are no further emergencies pending, the emergency button is removed from general status section 340. In an alternate embodiment, one or more of the alerts 342, 343, 344 may be permanently assigned to the area in section 340 below the virtual VU meter 341. For instance, the emergency button 344 may be permanently docked where shown and merely change appearance when there are no more pending emergencies (e.g., turns from red to gray).

Next, unselect module 350 is somewhat similar in nature to the select module 325 except that it is used to show information about talk groups other than the talk group currently assigned to the Select module 325. For instance, it also includes three text boxes 351a, 351b, 351c. Boxes 351a, 351b, and 351c show similar information to text boxes 330a, 330b, and 330c of the Select module 325. Specifically, they show the talk group, the individual within that talk group, and the volume of that talk group, respectively, corresponding to the most recent transmission in any talk group other than the selected talk group. In one embodiment, the text boxes 351a-521c show information only during actual transmissions (and when there are no active transmissions from field personnel, the text boxes 330a, 330b, and 330c are blank). However, in other embodiment, the text boxes may continuously show information for the most recent transmission even after the transmission ended).

Unselect module 350 also includes a counter 353 (in this example, in the form of an electronic UV meter) indicating the number of simultaneous transmissions (up to 4 in this example) that are being received (on all talk groups other than the talk group in select module 325). Particularly, this can be important information to have readily available since the transmissions on the unselected talk groups are being heard simultaneously via one or more speakers at the dispatch station and, sometimes, it may be difficult to discern how many transmissions are being heard simultaneously. There also is space within area 352 for additional buttons like the aforementioned emergency and PVT buttons.

Figure 10:
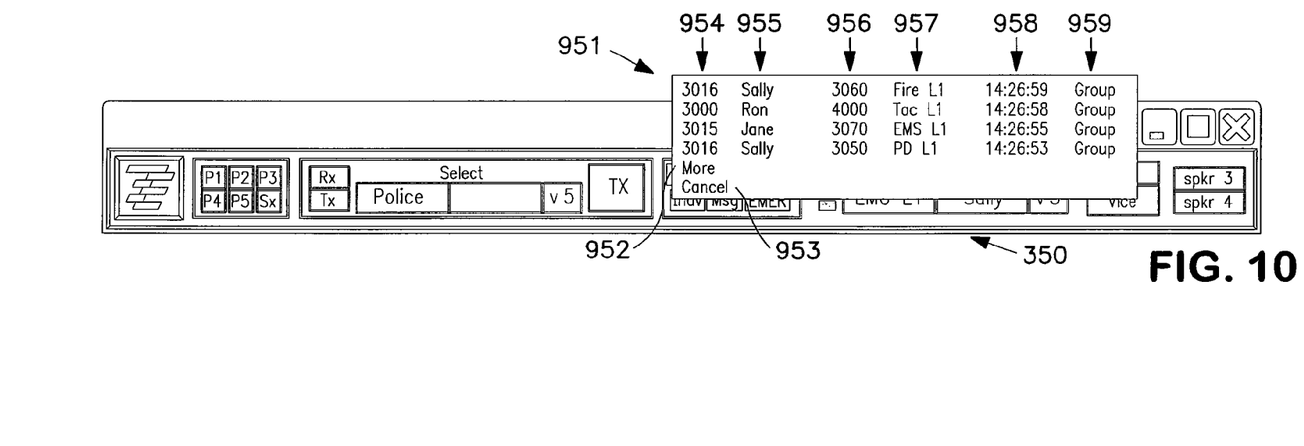
FIG. 10 illustrates a pop up window that can be opened from the unselect module in FIG. 3.

In accordance with one useful feature of the CDI 300, left clicking anywhere within the Unselect section 350 will call up a call history pop up window 950, such as the one illustrated in FIG. 10. This window provides a list 951 of the four most recent calls (preferably, including the one originally shown in the window sections 351a, 351b, 351c). However, it shows a little more information with respect to each call. For instance, for each of the four most recent calls, the pop up window 951 may show the caller's radio ID 954, the caller's name (or other alphanumeric designation) 955, the caller's group number 956, the callers group name 957, and the time of the call 959. It also happens to show the word "Group" 959 next to each entry for clarity. Finally, like the patch group pop up window 801 and the select group pop up window 901, this pop up window also permits the dispatcher to select a "More" option 952 to be presented with a full call history dialog box, rather than the abbreviated pop-up window 950. finally, a "Cancel" option 953 allows the operator to close the pop up window 951.

Unlike the select module 325, the unselect module 350 does not have a PTT button for permitting the dispatcher to transmit on that talk group. This is because each dispatcher normally may transmit on only one talk group at any time. If the dispatcher wishes to talk to one of the talk groups in the unselect module, he or she may make that talk group the selected talk group in select module 325 or right click to bring up a dialog that allows TX on any group in order to talk on that talk group.

Next, a group module 370 comprises only two buttons 371 and 372. This module is used to provide information about one specific talk group and may, for instance, be used to constantly monitor a particular talk group that is infrequently used, but, when used, usually carries extremely important communications such that the dispatcher would want to be immediately aware of it when a transmission is received on that talk group. This module has only two buttons. First, button 372 is a label indicating the particular group that has been assigned to the group module. Button 372 also is a PTT button so that the dispatcher may left click this button to transmit on that talk group without the need to make that talk group the selected talk group in select module 325. A second button 371 alternately shows the volume to which that talk group has been set or the identity of the individual transmitting on that talk group. Specifically, when there are no transmissions on that talk group, it shows the volume and, when there is a transmission on that talk group, it shows the identity of the person transmitting on that talk group. In some embodiments, more than one group module 370 may be provided in the CDI to permit tracking of multiple talk groups in this manner.

Finally, a speaker module 380 contains a plurality of buttons (in this example, two buttons 381, 382). Each button is dedicated to one of the multiple speakers typically located in a dispatch station. As previously noted, a dispatcher station usually has several speakers with each speaker typically outputting the audio from a plurality of talk groups simultaneously. In one embodiment, each of these buttons 381, 382 has a first appearance when there is no audio on the corresponding speaker and will have a second appearance when there is audio in that speaker. For instance, when there is no audio, the button 381 or 382 shows the identity of the speaker to which it corresponds (the speakers usually are assigned a number).

When there is audio, the button changes colors and possibly shows the talk group(s) that are the source of the audio. In other embodiments, it might show the individual generating the transmission, the volume of the corresponding talk group, or any other potentially relevant information.

Figure 5:
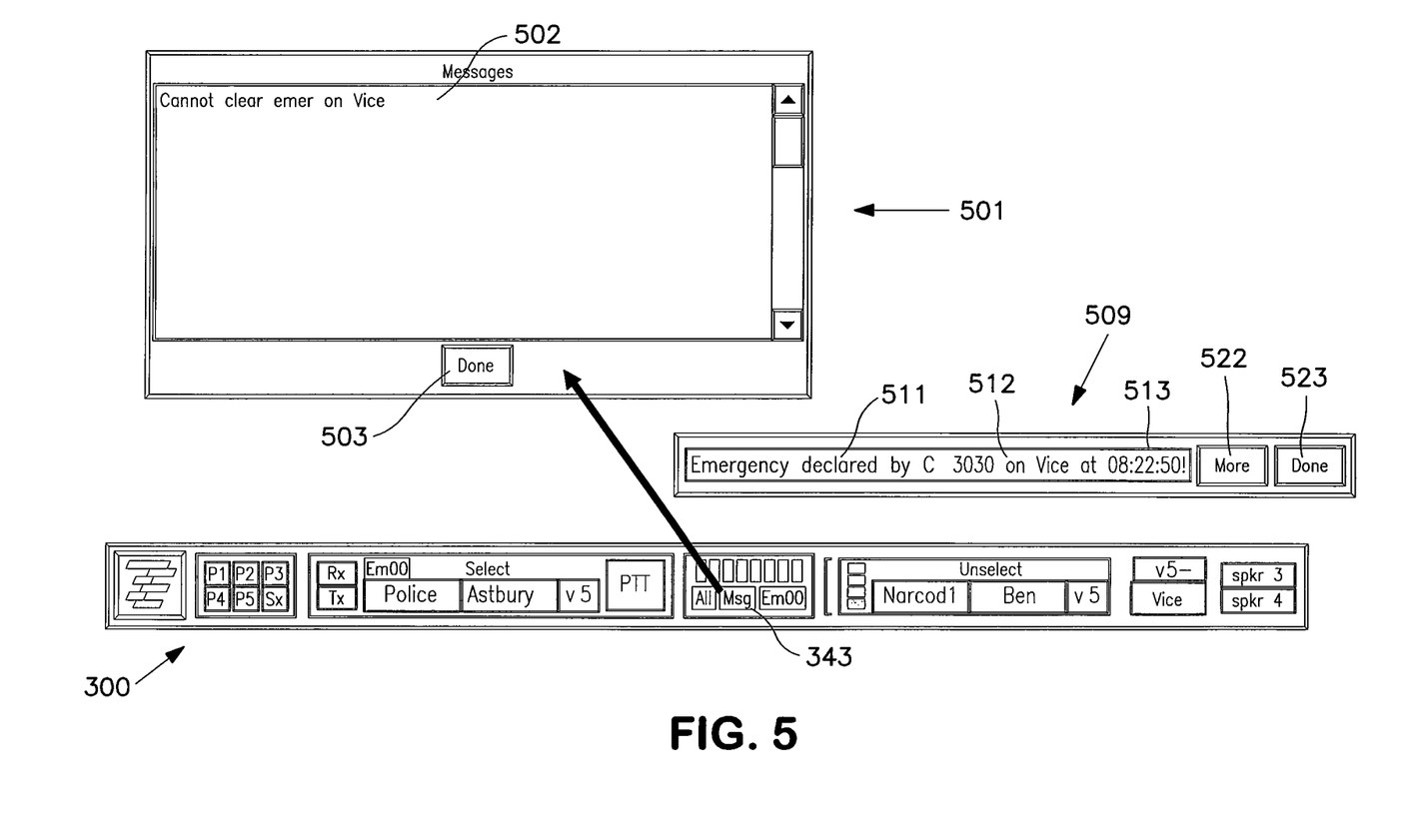
FIG. 5 illustrates further features of and additional graphical user interfaces that can be called up from the compact dispatch interface.

As previously mentioned and as described above for most of the buttons in exemplary CDI 300, any or all of the buttons in the CDI 300 may be designed to cause an action to occur and/or to call up an additional graphical user interface when clicked. One such feature was discussed above in connection with FIG. 4 in connection with clicking anywhere within the patch section 312 of CDI 300. FIG. 5 illustrates a few more of such examples. For instance, left clicking on the Message button 343 in General Status section 340 of CDI 300 will bring up a window 501 showing all of the pending messages 502. Window 501 can be made to disappear by clicking on the Done button 503 appearing in that window.

Furthermore, left clicking on the Emergency button 344 in General Status section 340 of CDI 300 will bring up an emergency dialog box 509. The emergency dialog box 509 shows relevant information about pending emergencies. In this particular example, it gives the identity of the field officer declaring the emergency 511, his or her talk group 512, and the time at which the emergency was declared 513. If the dispatcher wishes to see information about the emergencies, he or she may click on the More button 522, which will further expand the window to show additional information about the emergency. Again, when the dispatcher is finished with the window, clicking the Done button 523 will cause the window to disappear.

Figure 6:
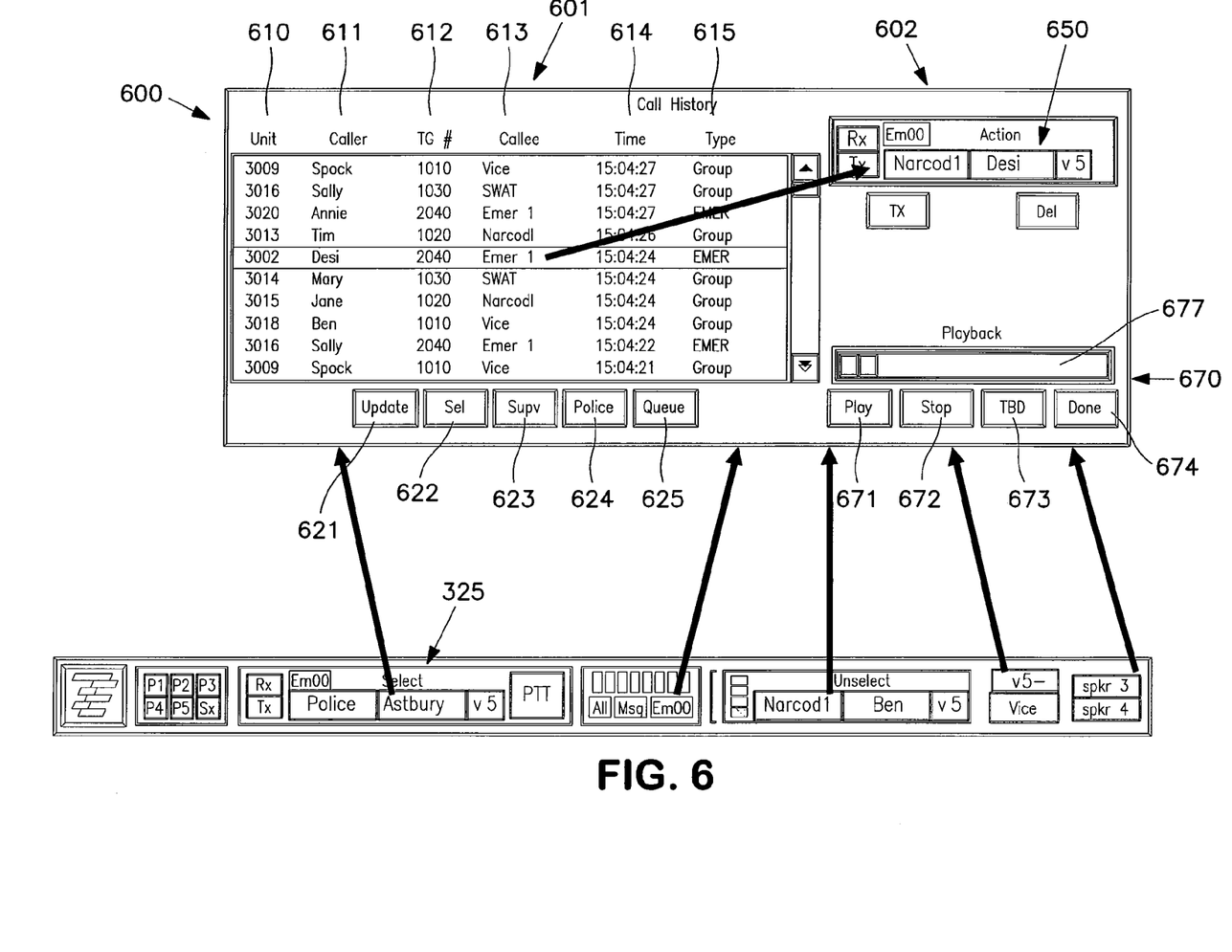
FIG. 6 illustrates yet further features of and additional graphical user interfaces that can be called up from the compact dispatch interface.

With reference to FIG. 6 and in accordance with another aspect of the invention, right clicking in various places in CDI 300 will call up a call history window 600, wherein the call history list 601 is pre-sorted or pre-filtered in a specific manner as a function of where the cursor was positioned within the CDI 300 when the mouse was right clicked. For instance, if the mouse is right clicked when the cursor is position in the select module 325, a call history window comes up showing all calls in the selected talk group (in reverse chronological order). On the other hand, if the mouse is right clicked while the cursor is over the emergency button 343, the call history window shows only those calls in talk groups that have an active emergency. If the mouse is right clicked while the cursor is in the unselect module 350, the call history shows all calls (in reverse chronological order) for all channels other than the selected channel. If the mouse is right clicked while the cursor is in the group module 370, the call history list shows the call history in the talk group that is assigned to the group module 370. As a final example, if the mouse is right clicked while the cursor is over either of buttons 381 or 382 in the speaker module 380, the call history window shows only the call history in talk groups assigned to that particular speaker. Once the call history window 600 is open, however, the dispatcher can re-sort and re-filter the list as desired.

The call history window 600 provides additional features, operations, and/or UI controls in it. For instance, the call history list portion 601 of the window includes the call list and shows relevant information about each call, such as the unit number 610 and an alias (alphanumeric name) of the caller 611. The former is used by the system to route calls. The latter is a human interface convenience. It also shows the corresponding talk group 612 of which the caller is a member, the identity of the callee 613, the time 614, and the type of communication 615. Along the bottom of the left-hand portion of the window are several buttons. Clicking on the update button 621 will cause the call history list to be updated. The next four buttons are all predetermined filter buttons. For instance, clicking on the SEL button 622 will cause only the call history in the talk group currently in the Select module 325 to be shown (which is the manner in which the call history list 601 would already be pre-filtered if the dispatcher had initially called up the call history window 600 by right clicking while the cursor was positioned in the Select module 325). Clicking on the SUPV button 623 filters out all calls except those in the supervisory talk groups. Likewise, clicking on the POLICE button 624 filters out all calls from radios that are not in one of the police talk groups. Finally, clicking on the Queue button 625 initiates a filtering algorithm that goes through the full call history list and filters out all but the most recent call from each individual. This Queue feature can be very useful insofar as, it is often the case that speaking with the last caller in a talk group is all that is needed to get caught up with respect to an incident. Also, it is often the case that a single caller calls many times in a row until he or she gets a response from the dispatcher.

Referring now to the right hand portion 601 of the call history window 600, this portion comprises a series of buttons for performing operations and/or providing information about a particular call selected from within the call history list window 601. For instance, the dispatcher can left click on one of the calls in the call history window to select it (whereupon it may be highlighted or otherwise visually altered to indicate that it is the selected call). Thereafter, all of the UI controls in the right hand portion and/or displayed information 602 of the window 600 will correspond to actions or information pertaining to that call from the call history window only. For instance, section 650 is a module very similar to the select module 325 in the CDI 300 and shows essentially the same information (the talk group, the individual caller and volume of that talk group). Clicking on the PTT button 655 permits the dispatcher to talk to that talk group. Clicking on the Delete button 657 will remove the selected call from the call history list 601. Portion 670 of the call history window 600 comprises playback buttons such as play 671, stop 672, and fast play 673. A playback progress bar 677 also is provided showing where within the call the playback currently is positioned. Finally, a Done button 674 closes the call history window 600.

Figure 7:
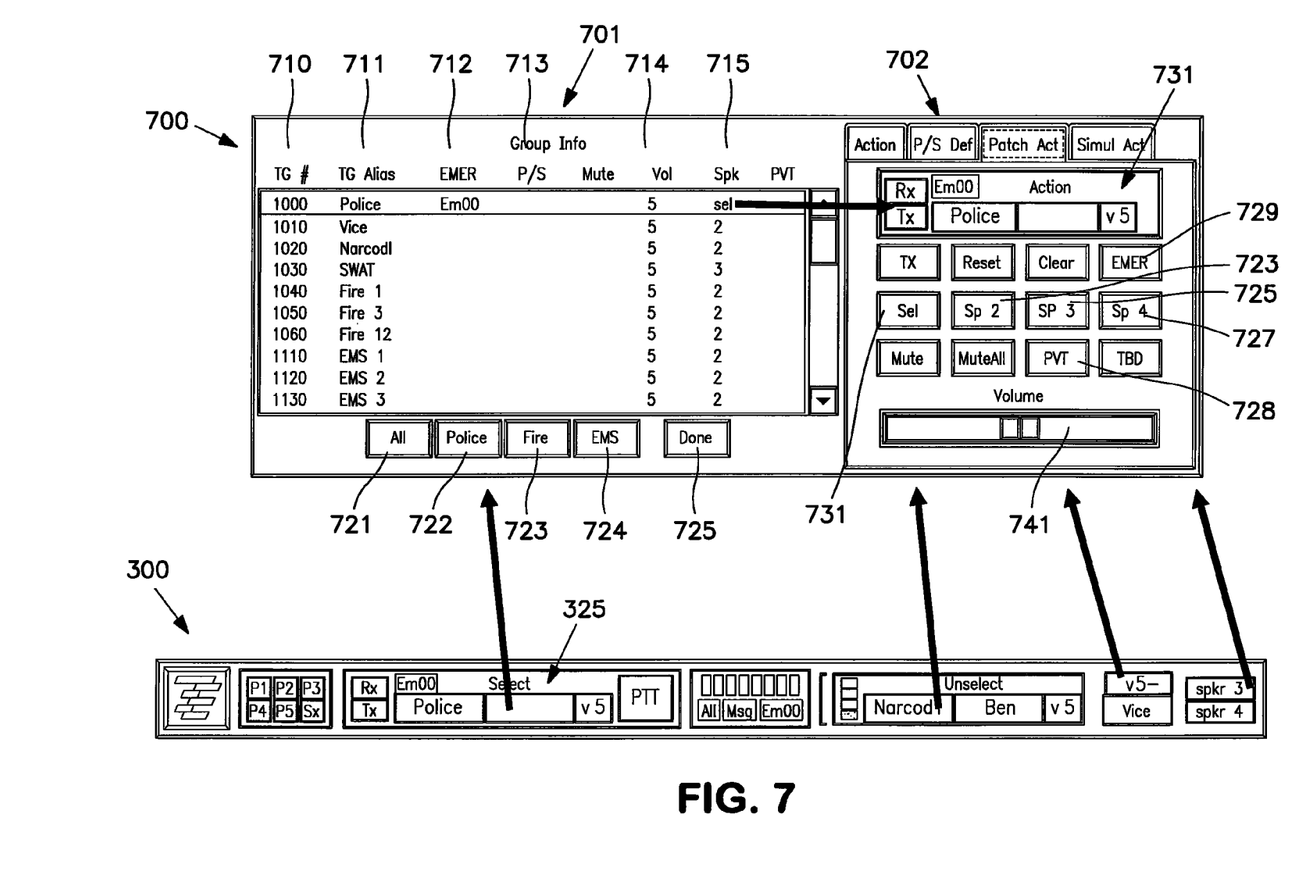
FIG. 7 illustrates another set of features of and additional graphical user interfaces that can be called up from the compact dispatch interface.

FIG. 7 illustrates yet another set of features and a related dialog window 700 that may be made available through appropriate operation in the CDI 300. In accordance with this aspect, a talk group information window 700 can be called up by a third mouse operation (such as double clicking one of the first two mouse buttons or clicking a third mouse button) performed while the cursor is positioned in any of the Select module 325, Unselect module 350, Group module 370, or Speaker module 380.

As before, the particular talk groups appearing in the group list may be prefiltered depending on where the cursor was positioned when the dispatcher called up the group information window 700. For instance, if the dispatcher activated the group information window 700 while the cursor was in the Select module 325, then only the information for the selected talk group appears. If, on the other hand, the dispatcher activated the group information window while the cursor was in the Unselect module 350, then all the information of all talk groups appears. If activated when the cursor was positioned over button 381 in Speaker module 380, then only the talk groups assigned to speaker 3 are listed in the group information window, etc.

The group information window 700 can be arranged similarly to the call history window. Particularly, the left hand side of the window 700 provides a list 701 of all the talk groups on the communication system and relevant information about each, such as the talk group number 710, a descriptive name of the group 711, whether there is an existing pending emergency in that talk group 712, the identity of any patch group or simulselect group 713 of which the talk group is a member, whether the talk group is currently muted 714 at the dispatch station, the current volume for that talk group 715, the speaker to which that talk group is assigned 716, and whether the talk group is using an encrypted channel 717. Again, across the bottom of the left hand portion are four filter buttons for filtering the group lists. These include All button 721 (list all talk groups), Police button 722, Fire button 723, and EMT button 724. There also is a DONE button 725 to close the window when the dispatcher is finished using it.

Also as previously described in connection with the call history window 600 and FIG. 6, the dispatcher may click on one of the talk groups in the left hand side of the window to highlight it, and then any operations performed or information shown in the right hand portion 702 of the window 700 will be performed on or correspond to that selected talk group. The right hand portion 702 of the display may be populated with any information and/or UI controls deemed likely to be particularly useful or relevant. A text box 731 that displays the same type of information as the Select module 325 of CDI 300 appears near the top. Merely as some other examples, there is a volume control slider 741 on the bottom that can be manipulated to set the volume for the selected talk group. There also is a Select button 731, which makes the group selected from the group list 701 the select group in Select module 325 of the CDI 300. Several speaker buttons 723, 725, 727 can be operated to assign the selected talk group to a particular speaker. The Emergency button 729 can be pressed to generate an emergency in the selected talk group. The PVT button 728 can be pressed to control the communication system to encrypt communications on the selected talk group.

As previously mentioned, the embodiments described herein are merely exemplary. Furthermore, in a preferred embodiment, the CDI graphical user interface is highly configurable by the purchaser and/or individual operators. For instance, the software for the CDI 300 may include a software module that provides a GUI within which the user may drag and drop UI controls, etc. into a blank or partially populated CDI template.

In another embodiment, the CDI software can be designed to interface with the CAD system software so as to allow the CAD system software to custom configure CDIs for specific situations. For instance, it is a common feature of many CAD systems for the system to generate a recommendation as to what resources should be committed to an incident that was input to the system (e.g., the incident report generated by a 911 call taker). For instance, the CAD system may receive an incident report of a car fire at grid location 24-59 and recommend that the dispatcher commit (1) a police car and its two occupants that is in the vicinity of the care fire, (2) a hook and ladder unit from the nearest fire station, and (3) a city tow truck to the incident. The dispatcher normally has the choice to accept the recommendation or ignore the recommendation and choose resources on his or her own. In any event, if the dispatcher chooses to accept the recommendation, the CDI program can be configured to interface with the CAD system to receive the incident report and then automatically build a CDI for that incident. For example, that CDI may comprise one button (or an entire module) for each of the personnel committed to the incident. The button (or module) may show some relevant information about the individual and also act as a PTT button for communicating with the individual. The CDI software may also automatically create a patch group comprising the relevant field personnel (and/or their talk groups) and include in the generated CDI a patch button just like the any of patch buttons 313a-313e assigned to that patch.

In order to enhance intuitive learning of the system's operation, all user operations of a certain type (e.g., a right mouse click) may be designed so as to correspond to computer operations of a similar theme. For instance, a right mouse click always calls up a new window or a left mouse click always selects something.

The invention has been described hereinabove as a software module or package. The software may be delivered to a user or customer on a computer readable medium from which it can be loaded onto a computer or other digital processing device into executable form for use. Alternately, it may be delivered in executable form and already embodied within a computing device. In addition, it should be understood that software is merely an example of an embodiment of the invention and that any or all of the above discussed features, steps, and processes may be implemented with software, firmware, hardware or combinations thereof. This includes, but is not limited to, computers, microprocessors, processors, digital signal processors, state machines, integrated circuits, FPGAs (Field Programmable Gate Arrays), combinational logic, analog circuits, digital circuits, program software, and any combinations thereof.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A non-transitory computer readable medium encoded with computer executable programming instructions for generating a graphical user interface for interfacing with a communication system, comprising:

a first computer software package having first executable instructions configured to control a communication network and provide a first graphical user interface within a display screen of a first computer system, said first graphical user interface comprising static elements including a plurality of User Interface controls facilitating the interface with and control of the communication system for coordinating efforts and locations of field personnel, the first graphical user interface designed to consume substantially all of the display screen; and a second computer software package that runs independently and exclusive from the first computer software package having second executable instructions configured to interface with a third computer software package running on a second computer system different than the first computer system for receiving an incident report that was input to said communication system after commencement of a temporal incident concerning at least one of a physical object, a person and a geographic location, dynamically select a subset of the User Interface controls that are useful for activating services necessary to respond to the temporal incident described in the incident report, which temporal incident a user is intending to address via communications with the communications network, and dynamically generate a second graphical user interface including the subset of the User Interface controls which were previously dynamically selected based on contents of the incident report, display the second graphical user interface while the first graphical user interface is being displayed within the display screen;

wherein the second graphical user interface is designed to consume only a portion of a display screen, and said subset of the User Interface controls provided in said second graphical user interface are concurrently also accessible through the first graphical user interface.

2. The non-transitory computer readable medium of claim 1, wherein the second graphical user interface is in the form of a toolbar.

3. The non-transitory computer readable medium of claim 1, wherein the second computer software package is running on the second computer system.

4. The non-transitory computer readable medium of claim 3, wherein the first computer system is a dispatch console for the communication network.

5. The non-transitory computer readable medium of claim 4, wherein the second computer system comprises a computer aided dispatch computer system.

6. The non-transitory computer readable medium of claim 5, wherein the second computer software package and the third computer software package are exclusive with respect to each other.

7. The non-transitory computer readable medium of claim 4, wherein the second executable instructions are further configured to provide an application programming interface.

8. The non-transitory computer readable medium of claim 1, wherein the first computer software package further comprises computer executable instructions for transmitting information about the communication system to the second computer software package, and the second computer software package further comprises computer executable instructions for receiving the information about the communication network and displaying the information in the second graphical user interface.

9. The non-transitory computer readable medium of claim 1, wherein the second computer software package further comprises computer executable instructions for calling up from at least one of the User Interface controls in the second graphical user interface at least one additional graphical user interface comprising additional User Interface controls allowing a user to interface with and control the communication system.

10. The non-transitory computer readable medium of claim 1, wherein the second computer software package further comprises computer executable instructions for permitting a user to select which User Interface controls appear in the second graphical user interface.

11. The non-transitory computer readable medium of claim 1, wherein said third computer software package communicates said incident report to said second computer software package in response to a user acceptance of a recommendation as to what resources should be committed to the incident.

12. The non-transitory computer readable medium of claim 1, wherein said second computer software package is further configured to automatically create a patch group based on the information contained in the incident report.

13. The non-transitory computer readable medium of claim 12, wherein one of said first User Interface controls is configured to facilitate communications with the patch group.

14. The non-transitory computer readable medium of claim 1, wherein said second computer software package is further configured to filter stored historical information so as to obtain a select portion thereof exclusively comprising all calls for all channel other than a selected channel, a call history in talkgroups assigned to a particular speaker, or calls of supervisory talkgroups, and generate a window that shows the select portion of the stored historical information.

15. A non-transitory computer readable medium encoded with computer executable programming instructions for generating a graphical user interface for interfacing with dispatch console software that controls a communication system, said computer executable programming instructions comprising:

first computer executable instructions for receiving an incident report from Computer Aided Dispatch ("CAD") system software, the incident report input to said communication system after commencement of a temporal incident concerning at least one of a physical object, a person and a geographic location, dynamically selecting a subset of first User Interface controls of a first graphical user interface provided by dispatch console software based on contents of the incident report, where the first graphical user interface comprises static elements including the first User Interface controls facilitating the interface with and control of the communication system for coordinating efforts and locations of field personnel, concurrent with the presentation of said first graphical user interface, dynamically generating a second graphical user interface comprising the subset of first User Interface controls which were previously dynamically selected based on contents of the incident report, where said subset of the User Interface controls is provided in said second graphical user interface also accessible through the first graphical user interface, and operable to control the dispatch console software to cause the dispatch console software to control the communication system, wherein at least one control of the subset of first User Interface controls also displays information about the communication system received from the dispatch console software, and displaying the second graphical user interface while the first graphical user interface is being displayed within a display screen of a dispatch console;

second computer executable instructions that, responsive to a first user interface operation in connection with one of the first User Interface controls, causes a graphical user interface window to open displaying information about the communication system in list form; and third computer executable instructions that, responsive to the first user interface operation, pre-sorts or pre-filters the list as a function of a first User Interface control in connection with which the first user interface operation was performed;

wherein said first, second and third computer executable instructions comprise a distinct software application that runs independently and exclusive of said dispatch console software.

16. The non-transitory computer readable medium of claim 15, wherein the pre-sorting or prefiltering is a function of events occurring in the communication system.

17. The non-transitory computer readable medium of claim 15, wherein the information about the communication system in list form comprises a list of calls made on the communication system.

18. The non-transitory computer readable medium of claim 17, wherein the graphical user interface window comprises a second User Interface control that, when operated, causes the list to be filtered to show only the last call by each caller on the communication system.

19. The non-transitory computer readable medium of claim 15, wherein the second graphical user interface is designed to consume only a portion of a display screen.

20. The non-transitory computer readable medium of claim 15, wherein the second graphical user interface is in the form of a toolbar.

21. The non-transitory computer readable medium of claim 15, wherein the first computer executable instructions are running on a computer different than a computer on which the dispatch console software is running.

22. The non-transitory computer readable medium of claim 15, wherein the second graphical user interface does not interface with the CAD system software.

23. The non-transitory computer readable medium of claim 15, wherein at least the first computer executable instructions are provided by a software module distinct from the dispatch console software and interfaces with the dispatch console software via an application programming interface.

24. The non-transitory computer readable medium of claim 15, wherein at least the first computer executable instructions are provided by a software module executing within the dispatch console software.

25. The non-transitory computer readable medium of claim 15, wherein at least the first computer executable instructions are provided by a plug-in software module to a module of the CAD system software.

26. The non-transitory computer readable medium of claim 15, further comprising:
fourth computer executable instructions for generating a third graphical user interface comprising second User Interface controls conveying information about talk groups in the communication system other than a selected talk group, the third graphical user interface including a text box that displays information about the most recently received call in any talk group other than the selected talk group.

27. The non-transitory computer readable medium of claim 15, further comprising:
fourth computer executable instructions for generating a third graphical user interface comprising second User Interface controls pertaining to a specific talk group;
fifth computer executable instructions for causing the third graphical user interface to include a fourth User Interface control displaying an identity of the at least one specific talk group and, responsive to operation of the fourth User Interface control, activate the specific talk group for communications; and
sixth computer executable instructions for causing the third graphical user interface to include a fifth User Interface control that displays a volume to which the specific talk group has been set when there are no communications in the specific talk group and displays an identity of an individual transmitting in the specific talk group when an individual is transmitting in the specific talk group.

28. The non-transitory computer readable medium of claim 15, further comprising:
fourth computer executable instructions for generating a speaker graphical user interface including a second User Interface control corresponding to each of a plurality of speakers; and
fifth computer executable instructions for causing each of the second User Interface controls to be in a first condition, responsive to the absence of communication in the corresponding talk group, in which it displays a volume to which the corresponding talk group has been set and to be in a second condition, responsive to transmissions in the corresponding talk group, in which it displays an identity of an individual transmitting in the specific talk group.

29. An apparatus for generating a graphical user interface for interfacing with a first computer software package for controlling a communication network and providing a first graphical user interface including User Interface controls for interfacing with and controlling the communication system, the first graphical user interface designed to consume substantially all of a display screen, comprising:
at least one computing device executing a software program which is independent and exclusive of said first computer software package for controlling said communication network, said software program operative to
receive, from a second computer software package that is different than the first computer software package, an incident report that was input to said communication system after commencement of a temporal incident concerning at least one of a physical object, a person and a geographic location,
dynamically select a subset of the User Interface controls that are useful for activating services necessary to respond to the temporal incident described in the incident report, which temporal incident a user is intending to address via communications with the communications network,
concurrent with the presentation of said first graphical user interface, dynamically generate a second graphical user interface including the subset of the User Interface controls which were previously dynamically selected based on contents of the incident report, where said subset of the User Interface controls are also accessible through the first graphical user interface, and the second graphical user interface is designed to consume only a portion of a display screen,
display the second graphical user interface while the first graphical user interface is being displayed in a display screen, and
transmit User Interface control inputs input into the computing device using the second graphical user interface from the software program to the first computer software package.

30. The apparatus of claim 29, wherein the second graphical user interface is in the form of a toolbar.

31. The apparatus of claim 29, wherein the software program is further operative to provide an application programming interface for interfacing with the second computer software package.

32. The apparatus of claim 29, wherein the software program is further operative to:
receive information about the communication system from the software package; and
display the information in the second graphical user interface.

33. The apparatus of claim 29, wherein the software program is further operative to call up from at least one of the User Interface controls in the second graphical user interface at least one additional graphical user interface comprising additional User Interface controls allowing a user to interface with and control the communication system.

34. The apparatus of claim 29, wherein the software program is further operative to permit a user to select which User Interface controls appear in the second graphical user interface.

35. An apparatus, comprising:
at least one computing device executing software configured to:
receive an incident report from Computer Aided Dispatch software which is independent and exclusive of said software executing on said computing device, where the incident report was input to a communication system after commencement of a temporal incident concerning at least of a physical object, a person and a geographic location;
dynamically select a subset of first User Interface controls of a first graphical user interface provided by dispatch console software based on content of the incident report, where
the first User Interface controls are useful for activating services necessary to response to the temporal incident described in the incident report, which temporal incident a user is intending to address via communications with the communication network,
at least one of the User Interface controls also displays information about the communication system received from the dispatch console software;
concurrent with the presentation of said first graphical user interface, dynamically generate a second graphical user interface comprising the subset of first User Interface controls which were previously dynamically selected based on contents of the incident report, said subset of the User Interface controls also accessible through the first graphical user interface;
display the second graphical user interface while the first graphical user interface is being displayed within the display screen;
responsive to a first user interface operation in connection with one of the first User Interface controls, cause a graphical user interface window to open displaying information about the communication system in a list; and
responsive to the first user interface operation, pre-sort or pre-filter the contents of the list as a function of a particular one of the first User Interface controls in connection with which the first user interface operation was performed.

36. The apparatus of claim 35, wherein the list is pre-sorted or pre-filtered as a function of events occurring in the communication system.

37. The apparatus of claim 35, wherein the list comprises information relating to calls made on the communication system.

38. The apparatus of claim 37, wherein the graphical user interface window comprises a second User Interface control that, when operated, causes the list to be filtered to show only the last call by each caller on the communication system.

39. The apparatus of claim 35, wherein second graphical user interface is designed to consume only a portion of a display screen.

40. The apparatus of claim 35, wherein the second graphical user interface is in the form of a toolbar.

41. The apparatus of claim 35, wherein the software of further configured to generate a third graphical user interface comprising second User Interface controls conveying information about talk groups in the communication system other than a selected talk group, the third graphical user interface including a text box that displays information about the most recently received call in any talk group other than the selected talk group.

42. The apparatus of claim 35, wherein the software is further configured to:
generate a third graphical user interface comprising second User Interface controls pertaining to a specific talk group;
cause the third graphical user interface module to include a third User Interface control displaying an identity of the at least one specific talk group and, responsive to operation of the third User Interface control, activate the specific talk group for communications; and
cause the third graphical interface to include a fourth User Interface control that displays a volume to which the specific talk group has been set when there are no communication in the specific talk group and displays an identity of an individual transmitting in the specific talk group when an individual is transmitting in the specific talk group.

43. The apparatus of claim 35, wherein the software is further configured to:
generate a speaker graphical user interface including a second User Interface control for each of a plurality of speakers; and
cause each of the second User Interface controls in the speaker graphical user interface module to be in a first condition when there are no communications in the specific talk group in which it displays a volume to which the specific talk group has been set and to be in a second condition, when an individual is transmitting in the specific talk group, in which it displays an identity of an individual transmitting in the specific talk group.

* * * * *